United States Patent
Ibaraki et al.

(10) Patent No.: US 7,964,014 B2
(45) Date of Patent: Jun. 21, 2011

(54) METAL OXIDE-BEARING GREEN PELLETS FOR REDUCING FURNACE, METHOD OF PRODUCTION OF SAME, METHOD OF REDUCTION OF SAME, AND REDUCTION FACILITY

(75) Inventors: Tetuharu Ibaraki, Kimitsu (JP); Hiroshi Oda, Kimitsu (JP); Shoji Imura, Kimitsu (JP); Masaharu Takahashi, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/804,844

(22) Filed: Jul. 29, 2010

(65) Prior Publication Data
US 2010/0294079 A1 Nov. 25, 2010

Related U.S. Application Data

(62) Division of application No. 10/415,675, filed as application No. PCT/JP01/09523 on Oct. 30, 2001, now Pat. No. 7,815,710.

(30) Foreign Application Priority Data

Oct. 30, 2000 (JP) ................................. 2000-331181
Oct. 30, 2000 (JP) ................................. 2000-331182
Sep. 6, 2001 (JP) ................................. 2001-269795
Sep. 6, 2001 (JP) ................................. 2001-269796

(51) Int. Cl.
*C22B 1/16* (2006.01)
(52) U.S. Cl. .......................................... 75/484; 75/771
(58) Field of Classification Search ................ 75/484, 75/771
See application file for complete search history.

(56) References Cited

U.S. PATENT DOCUMENTS 3,374,085 A 3/1968 Stone
3,765,869 A 10/1973 Schierloh et al.
(Continued)

FOREIGN PATENT DOCUMENTS
AU 432037 B2 1/1973
(Continued)

OTHER PUBLICATIONS

Xia et al. "Recent Research on the Pyrometallurgical and Hydrometallurgical Treatment of Electric Arc Furnace Flue Dust" Intertech 10th International Converence on Steel Mill Wastes by Products, 1997, pp. 138-196.

(Continued)

*Primary Examiner* — George Wyszomierski
*Assistant Examiner* — Tima M McGuthry-Banks
(74) *Attorney, Agent, or Firm* — Kenyon & Kenyon LLP

(57) ABSTRACT

The present invention provides a method and facility for preventing crumbling and powderization of green pellets when producing high strength green pellets using a powder feedstock and using the pellets in a rotary hearth reducing furnace and for efficiently reducing the same. It comprises kneading by a kneader 5 a feedstock of a powder of a fine particle size (20 to 80 wt % having size of not more than 10 μm) including a metal oxide and carbon-bearing powder fed from a feed storage tank 1 and producing green pellets by a pan type pelletizer 7. The green pellets are screened by a pellet screen 9, then dried by a pellet dryer 11 and reduced by firing in a rotary hearth reducing furnace 13. At that time, the green pellets are continuously conveyed to prevent crumbling.

14 Claims, 2 Drawing Sheets

U.S. PATENT DOCUMENTS

| | | |
|---|---|---|
| 3,969,103 A | 7/1976 | Capes et al. |
| 4,093,448 A | 6/1978 | Eliseev et al. |
| 4,231,797 A | 11/1980 | Fujita et al. |
| 4,257,806 A | 3/1981 | Fujita et al. |
| 4,701,214 A | 10/1987 | Kaneko et al. |
| 4,840,774 A | 6/1989 | Campbell et al. |
| 5,186,741 A | 2/1993 | Kotraba et al. |
| 5,601,631 A | 2/1997 | Rinker et al. |
| 5,730,775 A * | 3/1998 | Meissner et al. ............... 75/436 |
| 5,738,694 A | 4/1998 | Ford et al. |
| 5,865,875 A | 2/1999 | Rinker et al. |
| 6,342,089 B1 | 1/2002 | McGaa |

FOREIGN PATENT DOCUMENTS

| | | |
|---|---|---|
| CA | 1099518 | 4/1981 |
| CN | 1110325 A | 10/1995 |
| EP | 916 742 A1 | 5/1999 |
| EP | 924 304 A1 | 6/1999 |
| FR | 2 343 054 | 9/1977 |
| JP | 54-66314 | 5/1979 |
| JP | 61-207526 | 9/1986 |
| JP | 62-220590 | 9/1987 |
| JP | 62-270730 | 11/1987 |
| JP | 1-247534 | 10/1989 |
| JP | 4-165025 | 6/1992 |
| JP | 7-278687 | 10/1995 |
| JP | 9-279258 A | 10/1997 |
| JP | 10-147806 A | 6/1998 |
| JP | 10-192894 A | 7/1998 |
| JP | 11-193423 A | 7/1999 |
| JP | 11-241125 | 9/1999 |
| JP | 11-335746 | 12/1999 |
| JP | 2000-239752 A | 9/2000 |

OTHER PUBLICATIONS

Ajersch, "Chemical and Physical Characteristics Affecting the Reduction Kinetics of Iron Oxide Pellets with Solid Carbon", Canadian Metallurgical Quarterly 26:137-144 (1987).

Sintering and Pelletizing, vol. 20, No. 5, pp. 7-12, Sep. 1995.

* cited by examiner

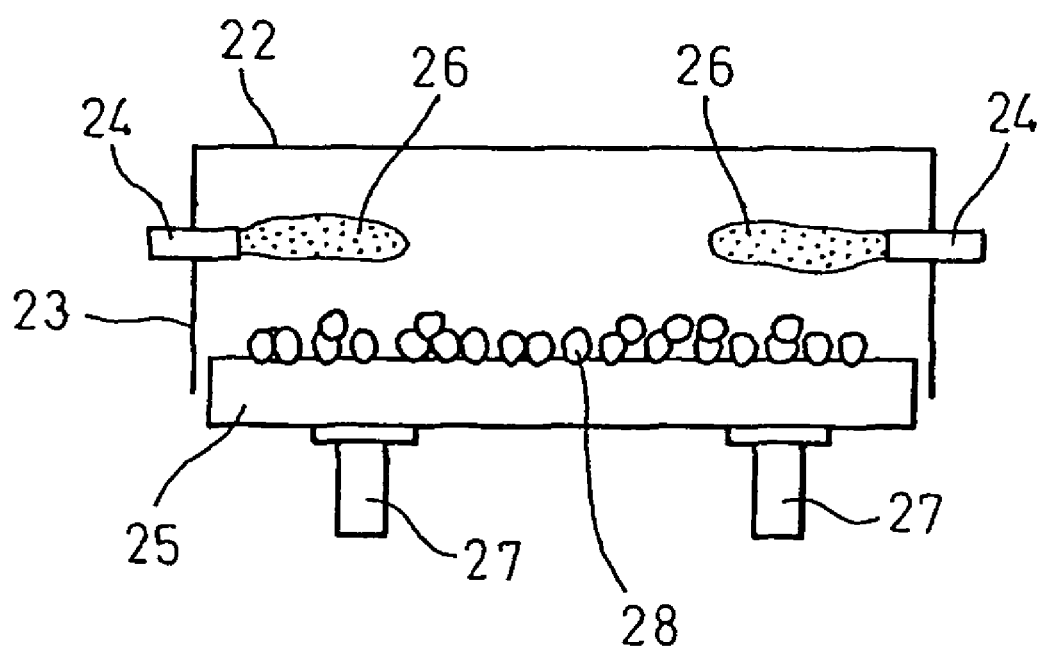

METAL OXIDE-BEARING GREEN PELLETS FOR REDUCING FURNACE, METHOD OF PRODUCTION OF SAME, METHOD OF REDUCTION OF SAME, AND REDUCTION FACILITY

This application is a divisional application under 35 U.S.C. §120 and §121 of prior application Ser. No. 10/415,675 filed Apr. 30, 2003, now U.S. Pat. No. 7,815,710, which is a 35 U.S.C. §371 of PCT/JP01/09523 filed Oct. 30, 2001, which claims priority to Japanese Application Nos. 2000-331181, filed Oct. 30, 2000, 2000-331182, filed Oct. 30, 2000, 2001-269796, filed Sep. 6, 2001, and 2001-269795 filed Sep. 6, 2001, the content of each of these applications is incorporated by reference in its entirety.

TECHNICAL FIELD

The present invention relates to metal-oxide bearing green pellets for a reducing furnace produced as an intermediate when reducing metal oxides of powderized ores etc. and dust or sludge containing metal oxides generated in metal refining industries and metal processing industries, a method of production of the same, a method of reduction of these green pellets by a rotary hearth reducing furnace or other reducing furnace, and a reduction facility. Note that in the present invention, "green pellets" are pellets before reduction in a reducing furnace, while "reduced pellets" are pellets reduced in a reducing furnace.

BACKGROUND ART

There are various types of metal reducing processes for producing reduced iron or alloy iron. Among these, there is a process using powder of a metal oxide as a feedstock, producing spherical pellets, and reducing these at a high temperature. As examples of this type of process, there are shaft type hydrogen gas reducing furnaces, rotary kiln reducing furnaces, rotary hearth reducing furnaces, etc. The green pellets used in shaft type hydrogen gas reducing furnaces are obtained by forming powder ore into grains and reduced by hydrogen gas. On the other hand, in rotary kiln reducing furnaces or rotary hearth reducing furnaces, heat is supplied from the reducing furnace and the reduction reaction is performed by the carbon mixed in the green pellets. That is, in a rotary kiln reducing furnace or rotary hearth reducing furnace, pellets comprised of the carbon of coal, coke, etc. mixed with the metal oxide powders are used. These processes can use inexpensive coal etc., so have caught attention as economical methods of production of reduced iron. Further, they are being used as high productivity processes in rotary hearth reducing furnaces.

A rotary kiln is a furnace comprised of a rotating cylinder having a diameter of 2 to 5 m and length of 30 to 80 m. The cylinder is made of steel and is lined with refractories. The furnace temperature is 300 to 600° C. at the feed part and about 1100° C. at the exit. The green pellets fed are heated over about 6 hours to about 1100° C. At that temperature, the carbon and metal oxide in the green pellets react to produce carbon monoxide and metal and form the reduced pellets. The reduced pellets are discharged from the kiln and cooled. After this, they are used as the feedstock for electric furnaces or blast furnaces.

A rotary hearth reducing furnace is a reducing furnace of a type having a disk-shaped hearth of refractories with a cut-away center rotating on rails at a constant speed under a fixed ceiling and side walls of refractories (hereinafter referred to as a "rotary furnace"). The diameter of the hearth of the rotary furnace is 10 to 50 meters and the width of the hearth 2 to 6 meters. The green pellets are fed to be uniformly spread on the hearth of the rotary furnace. The hearth rotates and moves the parts of the furnace, that is, the feed part, the heating zone, the reducing zone, and the discharging part, along with the green pellets. The green pellets are charged into the about 1000° C. high temperature feed part. Next, they are heated at the heating zone by radiation from the high temperature gas to about 1200° C. or more, then the carbon and metal oxide in the green pellets react at the reducing zone, whereby reduced metal is produced. In a rotary hearth reducing furnace, since the heating is quick, the reaction ends in 7 to 20 minutes. The reduced pellets are ejected from the furnace and cooled, then used as feedstock for electric furnaces or blast furnaces.

Further, in a rotary furnace, since the green pellets are placed stationarily on the hearth, there is the advantage that the pellets are resistant to crumbling in the furnace. As a result, there are the strong points that there are little problems of powderized feed sticking to the refractories and the yield of the nuggets is high. Further, there are the advantages that the productivity is high and an inexpensive or coal-based reducing agent or powder feed can be used.

As explained above, in a rotary furnace, the green pellets comprised of a powder feed including metal oxide and carbon shaped into grains is spread on the rotary hearth where it is reduced by heating. The green pellets are placed relatively stationarily on the hearth. As a result, easy to handle pellet-shaped reduced metal is obtained. If powder agglomerates like pellets, the contact between the metal oxide and carbon is good and the reduction reaction easily proceeds actively.

In this way, in these processes, powder comprised mainly of carbon and metal oxide is shaped into green pellets and these green pellets are used as feedstock for reduction by heating As the feedstock for the green pellets, powder ore, metal oxide dust, or other metal oxide and carbon as a reducing agent are used. In the production of reduced iron, pellet feed or other fine iron ore is used. The reducing agent used is carbon, but the ratio of the carbon not volatilizing (fix carbon) until the temperature where the reduction reaction occurs, that is, about 1100° C., is preferably a high one. As a source of such carbon, coke fines or anthracite is good.

In general, powders of two or more types of feedstock are used. This is for adjusting the ratio between the metal oxide and carbon. For production of green pellets, a pan type pelletizer is used. First, the powders of the feedstock are mixed in predetermined ratios, then the result is shaped into green pellets by the pan type pelletizer.

A pan type pelletizer is comprised of a rotary pan of a disk shape having a diameter of 2 to 6 m. The pan is inclined at about 45 degrees. A feed powder including water tumbles inside it. While this happens, the feed powder is coated around the generated nuclei which then grow into green pellets. The sufficiently grown green pellets leave the pan by their own weight.

When the rotary furnace is a rotary kiln, the green pellets are fed into the furnace without drying. This is because the temperature of the feed part of the rotary kiln is about 300° C. and the green pellets will not burst in the moist state. On the other hand, when a rotary hearth reducing furnace, the temperature of the green pellet feed part is 1000° C. or more, so green pellets containing moisture will burst due to evaporation of the moisture and therefore the green pellets are dried before being fed to the furnace.

For the feed powder containing the metal oxide (hereinafter referred to as the "metal oxide-bearing powder"), generally an ore is used, but sometimes use is made of iron-making dust or thickener sludge generated in the process of refining in a blast furnace, converter, electric furnace, etc. or the process of rolling and processing. In particular, dust or sludge generated in the steelmaking industry includes impurities such as zinc or lead, but these evaporate along with a reduction reaction of 1200° C. or more, so this reaction is an effective means for removal of impurities. It is also used as a process for treating dust containing large amounts of impurities and is effective for recycling of metal resources.

In this way, in the process for reducing green pellets, for stable operation, a high strength of the green pellets used as the feedstock is important. For example, with a vertical shaft furnace, if the green pellets are insufficient in strength, powder generated by crumbling of the green pellets will enter between the green pellets stacked in the furnace leading to the problem of obstruction of the flow of gas, the problem of too much dust trapped in the dust trap, etc. In the case of a rotary kiln, if the green pellets are insufficient in strength, the green pellets will crumble when tumbling in the kiln—leading to the problem of the dust generated at that time sticking to the refractories and creating a dam ring. As a result, the green pellets will not pass over the dam ring and green pellets will no longer flow through the inside of the kiln.

Further, in the case of a rotary hearth reducing furnace, if the green pellets are insufficient in strength, the green pellets will crumble, and the metal oxide powder of the crumbled green pellets will accumulate on the hearth and be heated and sinter at a high temperature of 1200° C. or more. The sintered powder will bond together and will sinter and bond with the refractories of the hearth as well to stick to the hearth. The stuck powder will build up on the hearth and cause wear on the blade of the screw-type discharger discharging the reduced pellets on the hearth. As a result, the blade lifetime will become extremely short. A blade which has a lifetime of at least one year in usual operation will sometimes have to be replaced in one month. Further, along with buildup on the hearth, it will become impossible to spread the green pellets on the hearth normally. To eliminate this problem, it is necessary to cool the entire furnace and use a breaker or other machine to break up and remove the buildup on the hearth. As a result, each time, the facility will have to be idled for at least five days. This is a problem causing a major drop in the operating rate.

In this way, if the green pellets are insufficient in strength, the operation of the reduction process becomes unstable. Therefore, to solve these problems, green pellets generating little powder have to be fed. Technology for producing high strength pellets under stable conditions has therefore been sought. In particular, this demand has been acute for pellets using powder containing carbon (powder coal, coke, charcoal, etc., hereinafter referred to as "carbon-bearing powder") as a feedstock, due to the problem of the strength being harder to raise compared with pellets made of only a metal oxide powder.

As methods of obtaining a high strength shaped article having no powder, there are the method of producing spherical green pellets by a pan type pelletizer, the method of forming briquettes by shaping by a mold etc., and the method of extrusion of a type extruding a shaped article from a perforated plate. Among these, green pellets obtained by a pan type pelletizer have the merit of inexpensive production of dense, high strength green pellets. The pan type pelletization method is therefore frequently used. With the conventional pelletization method, however, the only idea was to mix a powder metal oxide and a powder carbon source to form pellets. It was not always possible to produce high strength green pellets for a rotary hearth reducing furnace or other reducing furnace.

To meet with this demand, as prior art, for example, Japanese Unexamined Patent Publication (Kokai) No. 11-193423 proposes a method of improving the strength of green pellets by mixing in an organic binder at the time of pelletization at the pan type pelletizer. However, sufficient consideration was not given to the technology relating to the distribution of the particle size, ingredients, etc. of the feed powder and other feedstock conditions and the adjustment of moisture at the time of pelletization and other operating conditions. This method did not necessarily produce high strength green pellets. Further, green pellets for use in rotary kilns or rotary hearth reducing furnaces and produced from feed powder including coke fines etc. in a ratio of at least 5% are particularly difficult to shape. Sometimes the strength can be secured by addition of a binder, but in general the problem could not be solved by just addition of a binder.

Further, Japanese Unexamined Patent Publication (Kokai) No. 11-241125 discloses an apparatus for feeding dried green pellets to a rotary furnace from a pelletizer through a pellet dryer. This is an apparatus which dries the green pellets of the feedstock in advance to prevent the green pellets from bursting due to moisture on the high temperature hearth and is important technology. A method of production of high strength green pellets which will not crumble when passed through the steps explained above and the configuration of a facility for the same have not yet however been elucidated.

The problems when pelletizing feed powder including a carbon-bearing powder are not limited to the strength of the green pellets. When the feedstock conditions are poor, there is also the problem of discontinuous ejection of green pellets from the pan type pelletizer. That is, when the distribution of the particle size of the feed powder is poor or when adjustment of the moisture is improper, the growth of the green pellets in the pelletizer becomes unstable and the green pellets alternately are almost not ejected at all from the pelletizer and are ejected in large quantities. As a result, the feed of the green pellets to the reducing furnace connected to the downstream steps of the pelletizer becomes discontinuous and the problem of the reduction reaction becoming unstable arises. Further, the reduction in strength of the green pellets at the time when this phenomenon occurs is also a major problem.

Further, even if the strength of the green pellets is high, if the green pellets are handled unsuitably, the green pellets will be broken and powder will be generated during the screening or drying operation or during transport. Therefore, handling so as to prevent crumbling of the green pellets is also an important technology. In the conventional methods, however, this fact was not given sufficient attention. In the worst cases, 20 to 30% of the green pellets crumbled into powder during transport or drying.

Further, the crumbling of the green pellets due to drying at the time of feed into the hearth is also a problem. The green pellets produced by a pan type pelletizer are dense and high in strength in the moist state, but fall in strength when dried. Therefore, prevention of crumbling is important when dropping the dried green pellets on the hearth, but sufficient care has not been taken regarding this point either.

In this way, in the prior art, stable pelletization of feed powder containing a carbon-bearing powder has been technically difficult. As a result, the operation of the reducing furnace has become unstable and there was the problem that efficient production of metal was not possible.

Further, in a rotary hearth reducing furnace, it is necessary to produce green pellets high in strength both in the wet state and the dry state. It is necessary to produce green pellets higher in strength than even the green pellets used for other purposes. Therefore, a new technology has been sought for stably producing high strength green pellets using a powder containing a carbon-bearing powder as a feedstock and for realizing handling preventing crumbling of the same.

DISCLOSURE OF INVENTION

The present invention was made to solve the above problems and has the following as its gist:

(1) Metal oxide-bearing green pellets for a reducing furnace obtained by shaping a feed powder containing an oxide-bearing powder and 5 to 30 wt % of a carbon-bearing powder, said feed powder containing 20 to 80 wt % of particles of not more than 10 μm size.

(2) Metal oxide-bearing green pellets for a reducing furnace obtained by shaping a feed powder containing an oxide-bearing powder and 5 to 30 wt % of a carbon-bearing powder, said feed powder containing 20 to 80 wt % of particles of not more than 10 μm size, and having a porosity of not more than 32%.

(3) A method of production of metal oxide-bearing green pellets for a reducing furnace characterized by pelletizing a feed powder containing a metal oxide-bearing powder and a carbon-bearing powder, wherein, when producing the green pellets, said feed powder includes 20 to 80 wt % of powder particles of not more than 10 μm size.

(4) A method of production of metal oxide-bearing green pellets for a reducing furnace characterized by pelletizing a feed powder containing a metal oxide-bearing powder and 5 to 30 wt % of a dry distilled carbon-bearing powder, wherein, when producing the green pellets, said feed powder includes 20 to 80 wt % of powder particles of not more than 10 μm size.

(5) A method of production of metal oxide-bearing green pellets for a reducing furnace characterized by pelletizing a feed powder containing a metal oxide-bearing powder and 10 to 35 wt % of fine coal, wherein, when producing the green pellets, said feed powder includes 20 to 80 wt % of powder particles of not more than 10 μm size.

(6) A method of production of metal oxide-bearing green pellets for a reducing furnace characterized by pelletizing a feed powder containing a metal oxide-bearing powder and a total 10 to 60 wt % of two times the percent by weight of a dry distilled carbon-bearing powder and the percent by weight of fine coal, wherein, when producing the green pellets, said feed powder includes 20 to 80 wt % of powder particles of not more than 10 μm size.

(7) A method of production of metal oxide-bearing green pellets for a reducing furnace as set forth in any of paragraphs (3) to (6) characterized by mixing 0.5 to 4 wt % of bentonite or not more than 1 wt % of corn starch as a binder into said feed powder.

(8) A method of production of metal oxide-bearing green pellets for a reducing furnace as set forth in any of paragraphs (3) to (7) characterized by adjusting a moisture content in said feed powder before charging into a pelletizer and adjusting the moisture in said feed powder held in the pelletizer to a range of 8 to 13 wt % for pelletization.

(9) A method of production of metal oxide-bearing green pellets for a reducing furnace as set forth in any of paragraphs (3) to (8) characterized in that said feed powder contains 15 to 75 wt % of dust collected by a non-combustion type dust collector of converter gas and collected as thickener precipitate.

(10) A method of production of metal oxide-bearing green pellets for a reducing furnace as set forth in any of paragraphs (3) to (8) characterized in that said feed powder contains 15 to 75 wt % of dust contained in gas generated from an ironmaking electric furnace.

(11) A method of production of metal oxide-bearing green pellets for a reducing furnace as set forth in any of paragraphs (3) to (10) characterized in that the number of moles of atoms of carbon in said feed powder is 0.5 to 1.5 times the number of moles of atoms of oxygen of the metal oxide to be reduced by carbon in the range of 1200 to 1400° C.

(12) A method of production of metal oxide-bearing green pellets for a reducing furnace as set forth in any of paragraphs (3) to (11) characterized by drying said shaped green pellets to reduce the moisture content to not more than 2 wt %.

(13) A method of production of metal oxide-bearing green pellets for a reducing furnace as set forth in any of paragraphs (3) to (12) characterized by screening said shaped green pellets to remove undersized green pellets by a screen mesh of not less than 2 mm and to remove oversized green pellets by a screen mesh of not more than 30 mm.

(14) A method of reduction of metal oxide-bearing green pellets for a reducing furnace characterized by charging iron oxide-bearing green pellets for a reducing furnace as set forth in any of paragraphs (1) or (2) or iron oxide-bearing green pellets for a reducing furnace produced by a method as set forth in any of paragraphs (3) to (13) into a zone of a rotary hearth reducing furnace having a furnace ambient temperature of 900 to 1200° C. and reducing them by firing at a temperature of not less than 1200° C. for not less than 5 minutes.

(15) A method of reduction of metal oxide-bearing green pellets for a reducing furnace as set forth in paragraph (14) characterized by charging onto the hearth of the rotary hearth reducing furnace and reducing by firing green pellets having a mean diameter of 8 to 20 mm in a mean number of layers of not more than 2.0.

(16) A method of reduction of metal oxide-bearing green pellets for a reducing furnace characterized by pelletizing a feed powder comprised of a metal oxide-bearing powder and a carbon-bearing powder, including 20 to 80 wt % of powder particles having a size of not more than 10 μm, to make green pellets, screening the green pellets by a screen to remove undersized and oversized green pellets, reducing the moisture content by a pellet dryer, then charging the green pellets into a rotary hearth reducing furnace and reducing by firing the green pellets while continuously conveying green pellets between unit operations.

(17) A reducing facility for metal oxide-bearing green pellets for a reducing furnace comprised of a pan type pelletizer, a screen, a pellet dryer, and a rotary hearth reducing apparatus arranged in that order and provided with a continuous conveyor among them to link the same.

(18) A reducing facility for metal oxide-bearing green pellets for a reducing furnace comprised of a plurality of powder storage tanks having feeders controllable in feed rate, a kneader, a pan type pelletizer, a screen, a continuous pellet dryer, and a rotary hearth reducing furnace arranged in that order, provided with a moisture adder at one or both of the space between said powder storage tanks and said kneader and the space between said kneader and said pan type pelletizer, and provided with a continuous conveyor between the apparatuses from the powder storage tanks to the rotary hearth reducing furnace to link the same.

(19) A reducing facility for metal oxide-bearing pellets for a reducing furnace as set forth in any of paragraphs (17) or (18) characterized in that the total of the dropped heights of the pellets from said pan type pelletizer to said pellet dryer is not more than 7 m and the total of the dropped heights of the pellets from said pellet dryer to said rotary hearth reducing furnace is not more than 4 m.

BRIEF DESCRIPTION OF THE DRAWINGS

FIG. 2 is a view of a cross-section of a rotary hearth reducing furnace.

BEST MODE FOR CARRYING OUT THE INVENTION

Figure 1:
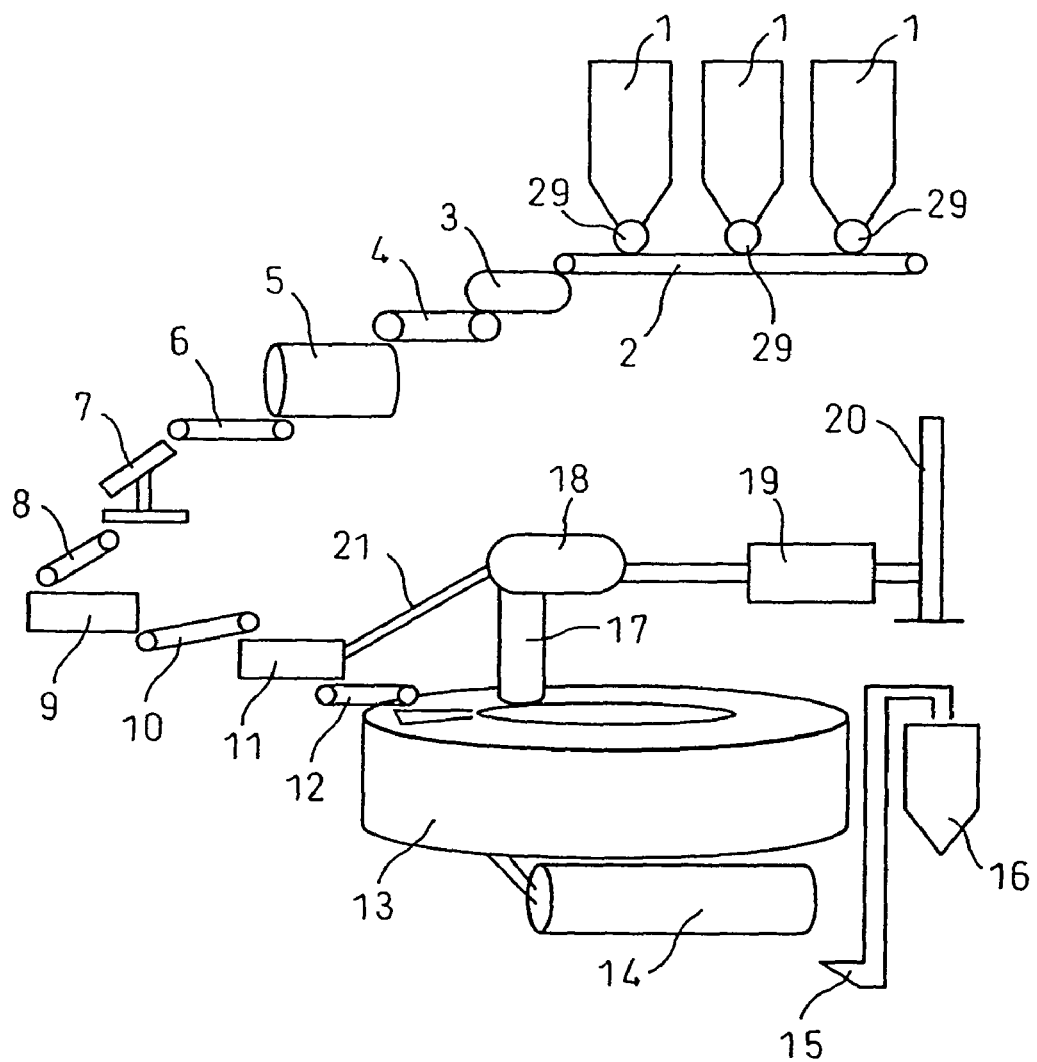
FIG. 1 is an overall flow chart of a rotary hearth reducing facility as an example of working of the present invention and shows the flow from the step of preparation of the feedstock to the step of reduction.

The present invention relates to green pellets made of powder containing metal oxide and carbon for a vertical type shaft furnace, rotary kiln, rotary hearth reducing furnace, or other reducing furnace using green pellets of a feed powder, a method of production of the same, a method of reduction of green pellets in such a reducing furnace, a facility for the same, and other technology. Here, the explanation will be given of the example of a rotary hearth method requiring the greatest strength of the green pellets, but the invention is not limited to a rotary hearth reducing furnace and can be applied to other reducing furnaces as well.

As an example of the method of operation of the present invention, a general overview of a rotary hearth reduction process is shown in FIG. 1. This facility is mainly comprised of a plurality of feed storage bins 1, a kneader 5, a pan type pelletizer 7, a pellet screen 9, a pellet dryer 11, and a rotary hearth reducing furnace 13. Note that in the present specification, the example of installation of a ball mill type kneader and a hot air type pellet dryer using waste heat is shown.

Two or more types of feedstock, that is, the feed powder including the metal oxide and carbon, are used to control the pelletizability, chemical ingredients for the reduction, and other required properties. Speaking from the viewpoint of the example performed by this facility, three types of powder, that is, relatively coarse iron oxide, fine iron oxide, and coarse coke fines were used. Iron ore fines called "pellet feed" consists of somewhat coarse particles for a rotary hearth reducing furnace and contains large amounts of iron oxide. Further, converter dust consists of fine particles and contains large amounts of iron oxide, Coke fines consists of coarse particles and contains large amounts of carbon. These three types of materials are used and placed in separate storage bins 1.

The ratios of mixture of the feedstocks are determined and the plurality of feedstocks are fed out onto the feed conveyor 2 from the plurality of feed storage bins 1. For this, the powder feeders 29 of the feed storage bins 1 have to have function of constant feeding with variable set value. The ratios of mixture are determined mainly adjusting the particle size, chemical ingredients, and moisture content. To increase the strength of the pellets, a suitable distribution of particle size is required, so coarse powder and fine powder are mixed in predetermined ratios. Further, to ensure a suitable reduction reaction, suitable ratios of the metal oxide and carbon are set. The powders are fed out onto the feed conveyor 2 in predetermined ratios mainly so as to satisfy the above two matters.

The ratio of carbon content in the feed powder is determined by the oxygen (active oxygen) chemically bonded with the metal oxide to be reduced. That is, an iron, nickel, or other oxide is reduced by carbon in a rotary hearth reducing furnace 13 at around 1200° C. to 1400° C. With reduction in a rotary hearth reducing furnace, the reduction reaction is mostly under conditions where the metal oxide and carbon form carbon monoxide. Therefore, the ratio of the carbon in the feed powder and the metal oxides including iron oxides is preferably 0.5 to 1.5 based on a center criteria of 1.0 of the ratio of the number of moles of atoms of carbon to the number of moles of atoms of active oxygen in these metal oxides. Note that the ratio of mixture of the carbon at this time is about 5 to 25 wt %.

As explained above, the carbon source used is coal, coke, charcoal, pitch, etc. In the case of coal, solid carbon and carbon included in volatile ingredients are included. The solid carbon contributes to the reduction reaction effectively, but the carbon in the volatile ingredients ends up volatilizing before the reduction reaction starts, so is not effectively utilized for the reduction. Therefore, an excess of carbon of coal is required as compared to the amount of carbon required for reduction and the ratio of mixture into the feed powder becomes greater.

Note that the moisture content is set so as to be lower than the suitable moisture content in the kneader 5 or the pan type pelletizer 7. Therefore, the chemical ingredients of the feedstock, distribution of particle size, moisture content, etc. are measured in advance.

When the moisture content of the feed powder placed on the feed conveyor 2 is not more than the suitable moisture content at the kneader 5, a moisture adder 3 is used to add moisture and a moisturized feed conveyor 4 is used to send the powder to the kneader 5. The ratios of mixture of the feed powders is determined with first priority given to the particle size and chemical ingredients, so the moisture of the feed powder is not necessarily in a range suitable for the kneader 5. Further, the moisture in the feed powder fluctuates by the weather and other conditions. Therefore, adjustment of the moisture at this stage is extremely important.

The kneader 5 homogeneously mixes the feed powder. At that time, if pulverizing the feed powder lightly, the production of the pellets in the pelletization step becomes stabler and the strength of the pellets is improved, so a kneader having a pulverizing function such as a ball mill is desirable. For example if using a kneader comprised of a cylinder, a cylinder rotating apparatus, and metal balls filled in the cylinder, it is possible to charge the feed powder into the cylinder and rotate the cylinder to knead the feed powder and pulverize the feed powder by the metal balls. There is a suitable moisture content of the powder for the type and size of the kneader 5. In the case of a ball mill, the moisture content is desirably in the range of about 6 to 9%.

The feed powder finished being kneaded is sent by a kneaded feed conveyor 6 to the pan type pelletizer 7. There, the feed powder is tumbled in a disk-shaped pan of a diameter of 2 to 6 m inclined about 45 degrees so that powder coats the nuclei generated and green pellets of several mm to about 30 mm size are produced. To produce high strength green pellets by a stable productivity in the pan type pelletizer, it is necessary that the distribution of particle size and moisture content of the feed powder be suitable. Note that generally the strength of the green pellets required for green pellets for a reducing furnace such as a rotary hearth reducing furnace is, in terms of crushing strength, at least $2 \times 10^5$ N/m$^2$. Further, such green pellets should have a 50 cm drop strength, defined by the number of times before cracking when dropped 50 cm, of at least 7 times, preferably 10 to 15 times, in the moist state and at least 3 times, preferably 4 to 8 times, in the dry state. The method of producing green pellets meeting these conditions will be described below.

To produce green pellets with a stable productivity and high strength as explained above, it is important first of all that the distribution of particle size of the feed powder be suitable. For example, even with the conventional pelletization technology, the presence of at least 60 wt % of particles of not more than 74 μm size was a required condition.

If however including a carbon-bearing powder like the feed powder handled in the present invention, with pelletization by the prior art, a stable pelletization operation and production of high strength green pellets were not possible. That is, carbon-bearing powder has a poor affinity with water and weakens the bonds between the feed powders in the green pellets. The carbon-bearing powder is poor in bonding with surrounding particles, so even if the distribution of particle sizes is substantially the same, green pellets containing carbon-bearing powder will be relatively low in strength. It was confirmed that the higher the ratio of the carbon-bearing powder, the lower the strength of the green pellets.

In the conventional pelletization method, when mixing a dry distilled powder such as coke or charcoal as the carbon-bearing powder in a ratio of more than 5 wt %, high strength pellets could not be produced. Further, in the case of coal, the limit value was 10 wt %.

The present inventors engaged in various experiments on the case of inclusion of at least 5 wt % of a carbon-bearing powder or at least 10 wt % of coal and as a result discovered that there are large spaces around carbon-bearing powder in green pellets and as a result the crushing strength is low. Therefore, the present inventors learned that it is important to fill the spaces and that use of a material with a suitable distribution of particle sizes results in dense powder inside the pellets, a higher strength of the pellets, a uniform size of green pellets in the pan type pelletizer, and a constant ejection rate.

While investigating the suitable distribution of particle sizes, the inventors mixed powder of not more than 10 μm size into the feed powder and pelletized the feed powder, whereby the small powder granules surrounded the relatively large size carbon-bearing powder, the green pellets became denser, and the strength of the green pellets was improved.

That is, it was learned that when fine particles and coarse particles are mixed in certain ratios, high strength green pellets can be produced.

Further, repeated experiments showed that if particles of not more than 10 μm size are present in an amount of at least 20 wt % in the feed powder as fine particles, the powder filling rate of the green pellets rises and it is possible to realize the strength sought for green pellets for reducing furnaces. Further, the size of the green pellets was made uniform in the pan type pelletizer 7, the discharge of green pellets from the pan type pelletizer 7 became uniform in speed, and the pelletization operation became stable. On the other hand, if the amount of the particles of not more than 10 μm size in the feed powder becomes more than 80 wt %, nuclei are not formed well inside the pan type pelletizer 7, the growth of the green pellets becomes slower, and only green pellets of a low density, insufficient strength, and unstable size can be produced. This is because adding too much fine particles conversely obstructs the densification. Therefore, feed powder consisting of the same feedstock, but having at least 20 wt % of particles of not less than 10 μm size was pelletized, whereby it was possible to produce high strength green pellets with a stable grain size.

That is, to produce dense, high strength green pellets, it is important that coarse particles and fine particles be mixed together in suitable ratios. That the ratio of particles of not more than 10 μm size comprise 20 to 80 wt % of the feed powder is an important condition.

However, if the ratio of the carbon-bearing powder in the feed powder is extremely large, the effect of mixing in fine particles of the feed powder to raise the strength of the green pellets also falls. In the case of dry distilled carbon-bearing powder treated, if the ratio of mixture exceeded 30 wt %, even if the ratio of particles of not more than 10 μm size was suitable, the strength of the green pellets did not exceed the above required value. Further, in the case of coal, if the ratio of mixture exceeded 35 wt %, the strength of the pellets did not exceed the above required value. Therefore, the ratio of the carbon-bearing powder in the feed powder of the present invention is 5 to 30 wt % in the case of a dry distilled carbon-bearing powder and in a range of 10 to 35 wt % in the case of coal. Further, when using a dry distilled carbon-bearing powder and coal mixed together, the total of two times the ratio of the dry distilled carbon-bearing powder and the ratio of the coal is in the range of 10 to 60 wt %.

There are various methods for adjusting the ratio of the feed powder of not more than 10 μm size. The easiest is to adjust the ratio of mixture of the feed powder having a high ratio of particles of not more than 10 μm size. As such powder, it is best to use dust collected as thickener precipitate from a non-combustion type dust collector of converter gas, that is, converter dust. Converter dust contains 80 to 90 wt % of particles of not more than 10 μm size and is desirable as a source of fine particles. Further, it has a high content of at least 70 wt % of iron, so there is also the effect that after reduction, production of good quality reduced pellets having a high iron content is possible. The ratio of mixture of the converter dust is preferably 15 to 75 wt %. Further, the dust contained in gas generated from an ironmaking electric furnace, that is, electric furnace dust, has similar effects. The ratio of mixture is preferably 15 to 75 wt %. However, electric furnace dust has a smaller content of iron, so is not efficient for production of reduced pellets having a high iron content.

In the pan type pelletizer, to produce high strength green pellets with a stable productivity, it is necessary that the moisture content be suitable in addition to the distribution of particle sizes of the feed powder. Therefore, it is necessary to finely control the moisture content of the feed powder in the pan type pelletizer 7. If the moisture content is too low, the growth of the green pellets will be slow and dense, high strength green pellets cannot be produced. Further, if the moisture content is too great, the small sized green pellets starting to grow will stick to each other resulting in green pellets of abnormal shapes and extremely low strength. In this state, further, pellets will no longer stably be produced from the pelletizer and green pellets will be intermittently discharged. As a result, the amount processed per unit time in the downstream steps of the pellet dryer 11 and the rotary furnace 13 will fluctuate in a short time and the overall process operation will become unstable.

Therefore, the present inventors sought the moisture content value suitable for the pan type pelletization method and as a result discovered that while differing depending on the type or size of the feed powder, there was a suitable value between 8 to 13 wt %. However, unless the fluctuation in the moisture content is made not more than 2% with the same type and size of the feed powder, the above-mentioned problems arise and pelletization becomes unstable. Therefore, it is important to adjust the feed powder before charging into the pan type pelletizer. For example, it is important to adjust it to a moisture content suitable for pelletization in the kneading step. When the suitable moisture content in the kneading step is lower than the moisture content value in the pelletization step, the moisture content is adjusted to a suitable range by a moisture adder, not shown in FIG. 1, between the kneading step and the pelletization step.

Further, depending on the composition of the feedstock, even if the distribution of the particle sizes is suitable, sometimes the strength of the green pellets is low and sometimes it is desired to raise the strength of the green pellets. In such cases, it is effective to mix in a binder. The present inventors discovered that bentonite and corn starch are binders which do not give off gas or moisture creating obstacles when reducing green pellets in a high temperature furnace. The suitable ratio of mixing of these binders is 0.5 to 4 wt % with respect to the feed powder for bentonite and not more than 1 wt % for corn starch. If the binder is mixed in with not less than this ratio, the same phenomenon occurs as when there is too much moisture, i.e., the small sized pellets stick together in the growth process and problems arise in the stability of the pelletization operation and the pellet strength.

If suitably producing green pellets by the above method, it is possible to produce dense green pellets having a porosity of not more than 32%. As a result, it is possible to produce pellets having a crushing strength of $2 \times 10^5$ N/m$^2$, a 50 cm drop strength in the moist state of 7 to 15 times, and a 50 cm drop strength in the dry state of 3 to 8 times. This satisfies the usage conditions in a reducing furnace.

The green pellets produced by the above method are screened to remove the powder and the large sized green pellets, then the pellets are dried by a dryer 11 and reduced by firing in a rotary furnace 13.

Note that the green pellets produced by the pan type pelletizer 7 contain small sized green pellets and powder as well. The small sized green pellets and powder cause the problem of obstruction of the flow of gas between the green pellets in the pellet dryer 11, the problem of buildup on the hearth of the rotary furnace, etc. Therefore, the green pellets are sent to a pellet screen 9 by a green pellet conveyor 8 where the small sized green pellets and powder are removed. If the screen mesh is too fine, the screen will easily clog, so the screen mesh is made at least 2 mm.

This pellet screen 9 is an effective means for removing oversized green pellets as well. The larger the green pellets, the lower the strength. Further, overly large green pellets take time for heat to be conducted to their insides and therefore have the problem of a longer reduction time in a rotary furnace. In particular, from the viewpoint of securing the strength of the green pellets, it is effective to remove green pellets of not less than 30 mm size.

Placing the pellet screen 9 before the pellet dryer 11 is important in the present invention. The reason is that generally when screening something by a screen, the operation is performed by a mechanical means such as vibration. Green pellets in the moist state have a relatively high strength, so can withstand such mechanical vibration. That is, if screening green pellets in the moist state by a screen, there are few green pellets which will crumble. However, dried green pellets are low in strength and often crumble. Therefore, as described in FIG. 1, it is effective to screen green pellets in the moist state.

The green pellets after screening are sent to the pellet dryer 11 by a post-screen conveyor 10 where they are then dried. As the type of apparatus, a hot air type dryer is preferable. Further, in the sense of energy savings, it is economical to create hot air at a heat exchanger 18 for recovering the sensible heat of the exhaust gas of the rotary furnace and use this for the drying. To prevent explosion of the green pellets along with evaporation of moisture, the drying is performed at a low temperature of not more than 250° C.

Note that after producing the green pellets by the pan type pelletizer 7, it is important to continuously process and transport and not to store the green pellets up until being fed on to the hearth 26 of the rotary furnace 13. Further, it is necessary to continuously process the green pellets in the pellet screen 9 and pellet dryer 11. In the case of batch processing, pellet storage tanks, dischargers, etc. are required before and after intermittent processing. If storing green pellets in a yard or bins, the weight of the green pellets on the top will crush the green pellets on the bottom or the shovel car or feeder will impart mechanical shock at the time of discharging and the green pellets will easily crumble.

Further, for these reasons, transport from the pan type pelletizer 7 to the rotary furnace 13 is preferably by a continuous conveyor such as a green pellet conveyor 8, post-screen conveyor 10, dry pellet conveyor 12, etc. without storing the green pellets. As the continuous conveyor, a belt conveyor or a pipe conveyor is effective. This is because these do not apply an unnecessary force to the green pellets during conveyance. Further, if a short distance, conveyance by a vibration type conveyor is also possible. It is desirable to use these conveyors at suitable locations making use of these particular properties.

That is, as shown in FIG. 1, by arranging a plurality of powder storage tanks 1 having feeders 29 capable of being controlled in feed rate, a kneader 5, a pan type pelletizer 7, a pellet screen 9, a pellet dryer 11, and a rotary hearth reducing furnace 13 in that order and further providing a moisture adder in one or both of the space between the powder storage tanks 1 and the) kneader 5 and the space between the kneader 5 and the pan type pelletizer 7, providing for example a feed conveyor 2, green pellet conveyor 8, post-screen conveyor 10, dry pellet conveyor 12, or other continuous conveyors, between these apparatuses from the powder storage tanks 1 to the rotary hearth reducing furnace 13, and, when providing a moisture adder 3 between the powder storage tanks 1 and the kneader 5, providing a moisturized feed conveyor 4 between the kneader 5 and the moisture adder 3, while, when providing a not shown moisture adder between the kneader 5 and the pan type pelletizer 7, providing a continuous conveyor of any not shown moisturized kneaded feed conveyor between the moisture adder and pan type pelletizer, the moisture content at the time of production of the green pellets is efficiently adjusted and the green pellets efficiently transported.

Further, even when operating suitably by the above processing and transport methods, with the strength of green pellets produced by the pan type pelletizer 7, if the total dropped distances during transport is long, the pellets will be destroyed by the drop impact. The present inventors found that the strength of the green pellets was a maximum of 15 times at 50 cm drops before drying and a maximum of 8 times at 50 cm drops in the dry state and that, considering from the strength of the green pellets, the total dropped distances from the pan type pelletizer 7 to the pellet dryer 11 of the green pellets in the moist state had to be not more than 7 m and the total dropped distances from the pellet dryer 11 to the hearth 25 of the rotary furnace 13 of the green pellets in the dry state had to be not more than 4 m.

Next, the dried green pellets are sent by the dry pellet conveyor 12 to the rotary furnace 13 where they are reduced by firing.

In ordinary operation of a rotary furnace, the temperature of the hearth is 1000 to 1150° C. and the ambient temperature of the heating zone is 900 to 1200° C.

The dried green pellets are fed to a portion of the rotary furnace where the ambient furnace temperature is 900 to 1200° C. By feeding dense green pellets having a porosity of not more than 32% to such a high temperature atmosphere, there is a danger of bursting due to the evaporation of moisture inside the green pellets. Therefore, to prevent the dense green pellets having a porosity of not more than 32% from bursting due to moisture under such temperature conditions, it is important that the moisture content of the green pellets be low. The present inventors investigated the moisture content at which green pellets produced by the method of the present invention would not burst under these conditions and as a result found there was no problem if the moisture content is not more than 2 wt %. Therefore, it is effective to reduce the moisture content of the green pellets after drying to not more than 2%.

As shown in FIG. 2, the rotary furnace 13 is comprised in structure of a rotary type hearth 25 moving above a wheel 27 below a ceiling 22 and furnace walls 23. The green pellets 28 are placed stationarily on the hearth 25 and circle the inside of the furnace. In the furnace, combustion gas is burned from a burner 24. The maximum temperature of the gas is made a suitable temperature between 1200° C. and 1400° C. The fed green pellets 28 initially enter the furnace portion having a high oxidation degree of the gas and 900 to 1200° C. in temperature (heating zone) where they are heated. Next, the green pellets are reduced at the portion with a low gas oxidation degree and high temperature (reducing zone).

In the reducing zone, the temperature at which the iron, nickel, or other metal oxide reacts strongly with carbon and is reduced is at least 1200° C., so the fed green pellets are fired by heating to at least 1200° C., whereupon the metal oxide and carbon react and the reduced metal and carbon monoxide are produced. Further, zinc, lead, and other metals having a high vapor pressure at about 1200° C. are removed by evaporation from the green pellets. The reduction' time is a minimum of 5 minutes. After reduction for 5 to 20 minutes, the iron or nickel or other relatively easily reduced metal of the green pellets is reduced. The heat transfer of the rotary furnace 13 is the ratiotion of the high temperature gas above the green pellets and the heat conduction from the hearth 26. Therefore, with up to two stacked layers of green pellets, heat is conducted directly from either the top or the bottom, but with not less than two stacked layers of green pellets, the green pellets in the middle do not easily directly receive heat and the reduction reaction is slower. Therefore, the mean number of layers of pellets is desirably not more than 2.0. If considering the mode and speed of heat transfer in the rotary furnace 13 in this way, the mean size of the green pellets is preferably 8 to 20 mm. If the mean size of the green pellets is not more than 8 mm, the productivity per hearth area falls, while if the mean size of the green pellets is not less than 20 mm, the heat is transferred slower inside the green pellets and therefore the reduction reaction of the center parts will not end with a reaction time of about 5 minutes.

The reduced pellets finished being reduced are discharged from the rotary furnace 13 by an discharger. The reduced pellets discharged from the rotary furnace are sent to the melting step in the high temperature state or cooled at the reduced pellet cooling apparatus 14 and sent via the reduced pellet conveyor 15 to the reduced pellet storage tank 16. In FIG. 1, the example of provision of a facility for cooling the reduced pellets is shown. Next, the green pellets are sent to a step using them in for example a blast furnace, electric furnace, or converter.

Note that the combustion exhaust gas from the rotary furnace is sent from an exhaust duct 17 to the heat exchanger 18 where it is used to heat air. The air is used as a heat source for drying the green pellets. Next, the combustion exhaust gas is cleaned of dust by the dust collector 19 and discharged from the chimney 20 to the atmosphere.

Green pellets produced by the method of the present invention can be used for reduction not only in a rotary hearth reducing furnace, but also reduction by a rotary kiln or reduction in a low height vertical shaft furnace. In a rotary kiln, there is the effect of prevention of formation of a dam ring inside the kiln due to production of high strength green pellets. Further, in a vertical shaft furnace, there is the effect of prevention of obstruction to circulation of gas in the furnace due to the generation of dust. That is, when using the reduced pellets in a blast furnace, it is necessary that the feedstock be grain shapes. That is, in a blast furnace, the flow rate of gas in the furnace is fast, so there is a problem of spraying of dust etc. and feedstock of a grain size of 3 to 5 mm or more is used. The reduced pellets according to the present invention have a high ratio of pellet shapes, so are suitable for use in a blast furnace etc.

EXAMPLES

Example 1

The results of operation using the facility of a rotary hearth reducing furnace shown in FIG. 1 are shown. The facility produces 15 tons of reduced iron pellets for blast furnace use every hour. There were three materials: pellet feed powder ore, converter dust, and coke fines.

The pellet feed ore contained 89 wt % of ferric oxide ($Fe_2O_3$), had a mean particle size of 68 µm, and had a ratio of particles of not more than 10 µm size of 13 wt %. Further, the converter dust contained 34 wt % of iron oxide (FeO) and 43 wt % of metal iron, had a mean particle size of 6 µm, and had a ratio of particles of not more than 10 µm size of 81 wt %. The coke dust fines contained 83 wt % of carbon, had a mean particle size of 89 µm, and had a ratio of particles of not more than 10 µm size of 8 wt %.

In Example 1, 40 wt % of pellet feed powder ore, 37 wt % of converter dust, and 23 wt % of coke dust fines were mixed and fed out on to a feed transport conveyor 2. The ratio of particles of not more than 10 µm size was 36 wt %. Further, the molar ratio of atoms of carbon and oxygen bonded with the iron oxide was 0.86. The ratio of powder of not more than 10 µm size in the feed powder was in the range of 20 to 80 wt %, so the method of mixing was according to the present invention.

The moisture content of this mixed feed powder was 7 to 8 wt %, so water was sprinkled to add moisture in advance to obtain a mixture content of about 9 wt %, then about 1 wt % of moisture was added by sprinkling by the pan type pelletizer 7 to stabilize pelletization. By this method, the moisture content was made a suitable moisture content for the pan type pelletizer 7, that is, 9.5 to 11 wt %. Note that in Example 1, as the binder, bentonite was added in an amount of 1.4 wt % of the weight of the feed powder. The shaped green pellets had a mean diameter of 13.4 mm and a mean crushing strength of $2.9 \times 10^5$ N/m² and therefore were green pellets with a high strength. Further, the 50 cm drop strength of the green pellets was 9 times in the moist state and 4 times in the dry state.

The green pellets were dried and fed to a rotary furnace 9. During this time, the green pellets crumbling before reduction accounted for 7.5 wt % of the total. The grain ratio over 4 mm of the reduced pellets after 12 minutes at a maximum temperature of 1320° C. was 92 wt % and the metallization rate was a good 92 wt %.

Next, as Comparative Example 1, the results when operating based on a conventional method are shown. The facility used was that of FIG. 1, but the method of operation was the same as in the past. As the feedstock, a feed powder comprised of 74 wt % of the above-mentioned pellet feed powder ore and 26 wt % of coke dust fines mixed together was used. The ratio of particles having a size of not more than 10 µm at this time was 12 wt %. Further, the molar ratio of atoms of carbon and oxygen bonded with the iron oxide was 1.0.

This feed powder was adjusted in moisture content, then shaped into green pellets by the pan type pelletizer 7. The method of operation was the same as in Example 1. As a result, green pellets of a mean diameter of 12.8 mm were obtained, but the mean crushing strength was $1.3 \times 10^5$ N/m$^2$, so the strength was low. Further, the 50 cm drop strength of the green pellets was 5 times in the moist state and 1 time in the dry state.

The green pellets were screened, dried, and reduced in the same way as in Example 1. As a result, the green pellets crumbling before reduction accounted for a large 19.8 wt % of the total. Further, the grain ratio over 4 mm of the reduced pellets was a small 78 wt % and the metallization rate was a low 78 wt %. Since the ratio of green pellets crumbling during operation or transport was large or the ratio of green pellets becoming powder on the hearth 25 was large in this way, the powder reoxidized in the furnace or after discharging and the metallization rate fell by a large extent.

In this way, in Example 1 of operation using the present invention, there were few green pellets crumbling in the middle of the processing and the operation was performed with a high ratio and metallization rate of the reduced pellets as a product. On the other hand, in Comparative Example 1, these results were poor.

Example 2

The results of operation using the facility of a rotary hearth reducing furnace shown in FIG. 1 are shown. The facility produces 15 tons of reduced iron pellets for blast furnace use every hour. There were three material storage bins containing pellet feed powder ore, converter dust, and coke dust fines of a coke dry quencher.

The pellet feed ore contained 89 wt % of ferric oxide (Fe$_2$O$_3$), had a mean particle size of 68 μm, and had a ratio of particles of not more than 10 μm size of 13 wt %. Further, the converter dust contained 34 wt % of iron oxide (FeO) and 43 wt % of metal iron, had a mean particle size of 6 μm, and had a ratio of particles of not more than 10 μm size of 81 wt %. The coke dust fines contained 83 wt % of carbon, had a mean particle size of 89 μm, and had a ratio of particles of not more than 10 μm size of 8 wt %.

In Example 2, 40 wt % of pellet feed powder ore, 37 wt % of converter dust, and 23 wt % of coke dust fines were mixed and fed out on to a material transport conveyor 2. The mean particle size of this mixed feed powder was 50 μm, while the ratio of particles of not more than 10 μm size was 36 wt %. Further, the molar ratio of atoms of carbon and oxygen bonded with the iron oxide was 0.86. The ratio of powder of not more than 10 μm size in the feed powder was in the range of 20 to 80 wt %, so the method of mixing was according to the present invention.

The moisture content of this feed powder was 5.7 wt %. On the other hand, the moisture content value enabling suitable kneading by the ball mill type kneader 5 of FIG. 1 is 7 to 9 wt %, so water was sprinkled to obtain a moisture content of 8.2 wt % by a moisture adder 3. Note that with a ball mill, if the moisture content is too low, the mixing is poor, while if the moisture content is too high, powder sticks to the inside wall of the cylinder, so it is important to control the moisture to this range. Here, the feed powder was sufficiently mixed and sent on to the next pelletization step where the feed powder was pelletized by the pan type pelletizer 7. The moisture content value suitable for pelletization in Example 2 was 9.5 to 11 wt %. Further, with the pan type pelletizer 7, pelletization was stabilized by sprinkling 1 to 1.5 wt % of water there. In Example 2, the moisture content of the feed powder before entering the pan type pelletizer 7 was in a suitable range, so no moisture was added before the pan type pelletizer 7. When the moisture content of the feed powder is low, however, moisture is added. Note that in Example 2, as the binder, bentonite was added in an amount of 1.4 wt % of the weight of the feed powder.

The shaped green pellets had a mean diameter of 13.4 mm and a mean crushing strength of $2.9 \times 10^5$ N/m$^2$ and therefore were green pellets with a high strength. Further, the 50 cm drop strength of the green pellets was 9 times in the moist state and 4 times in the dry state.

The green pellets were screen by a pellet screen 9 to remove pellets of not more than 5 mm or not less than 25 mm size, then were dried by a pellet dryer 11 and fed to a rotary furnace 13, During this time, the green pellets crumbling before reduction accounted for 7.5 wt % of the total. The grain ratio over 4 mm of the reduced pellets discharged from the furnace after reduction for 12 minutes at a maximum temperature of 1320° C. was 92 wt % and the metallization rate was a good 92 wt %.

Next, as Comparative Example 2, the results when operating based on a conventional method are shown. The facility used was that of FIG. 1, but the method of operation was the same as in the past. As the feedstock, a feed powder comprised of 74 wt % of the above-mentioned pellet feed powder ore and 26 wt % of coke dust fines mixed together was used. The ratio of particles having a size of not more than 10 μm at this time was 12 wt %. Further, the molar ratio of atoms of carbon and oxygen bonded with the iron oxide was 0.86.

This feed powder was adjusted in moisture content, then shaped into green pellets by the pan type pelletizer 7. The method of operation was the same as in Example 2. As a result, green pellets of a mean diameter of 12.8 mm were obtained, but the mean crushing strength was $1.3 \times 10^5$ N/m$^2$, so the strength was low. Further, the 50 cm drop strength of the green pellets was 5 times in the moist state and 1 time in the dry state.

The green pellets were screened, dried, and reduced in the same way as in Example 2. As a result, the green pellets crumbling before reduction accounted for a large 19.8 wt % of the total. Further, the grain ratio over 4 mm of the reduced pellets was a small 78 wt % and the metallization rate was a low 78 wt %. Since the ratio of green pellets crumbling during operation or transport was large or the ratio of green pellets becoming powder on the hearth 25 was large in this way, the powder reoxidized in the furnace or after discharging and the metal conversion rate fell by a large extent.

In this way, in Example 2 of operation using the present invention, there were few green pellets crumbling in the middle of the processing and the operation was performed with a high grain ratio and metallization rate of the reduced pellets as a product. On the other hand, in Comparative Example 2, these results were poor.

INDUSTRIAL APPLICABILITY

By using the green pellets of the present invention, method of production of the same, method of reduction of the same, and reduction facility, it is possible to produce high strength green pellets able to withstand use in a reducing furnace. It is possible to reduce the green pellets by firing in a reducing furnace such as a rotary kiln or rotary hearth reducing furnace without crumbling the pellets and possible to obtain reduced pellets high in grain ratio and high in reduction rate. By using the pellets reduced by this reducing furnace, a reduced metal can be efficiently produced.

LIST OF REFERENCES

1 . . . feed storage bin
2 . . . feed conveyor
3 . . . moisture adder
4 . . . moisturized feed conveyor
5 . . . kneader
6 . . . kneaded feed conveyor
7 . . . pan type pelletizer
8 . . . green pellet conveyor
9 . . . pellet screen
10 . . . post-screen conveyor
11 . . . pellet dryer
12 . . . dry pellet conveyor
13 . . . rotary hearth reducing furnace (rotary furnace)
14 . . . reduced pellet cooler
15 . . . reduced pellet conveyor
16 . . . reduced pellet storage tank
17 . . . exhaust duct
18 . . . heat exchanger
19 . . . dust collector
20 . . . chimney
21 . . . preheated air duct
22 . . . ceiling
23 . . . furnace wall
24 . . . burner
25 . . . hearth
26 . . . flame
27 . . . wheel
28 . . . pellets
29 . . . feeder

The invention claimed is:

1. A method of reduction of metal oxide-bearing green pellets for a reducing furnace characterized by charging
    (i) iron oxide-bearing green pellets for a reducing furnace obtained by shaping a feed powder containing a metal oxide-bearing powder and 5 to 30 wt % of a carbon-bearing powder, wherein, when shaping the green pellets, three or more types of feed powder, including at least two types of iron containing feed powder, are placed in separate storage bins, a mixing ratio of a mixture of feed powders is determined so that the mixture of said feed powder includes 20 to 80 wt % of powder particles of not more than 10 μm size and said feed powders are fed out from said bins, and the mixture of said feed powders is shaped into green pellets having a porosity of not more than 0.32 using a pan type pelletizer and then the green pellets are dried in a dryer at a temperature of not higher than 250° C., or
    (ii) iron oxide-bearing green pellets for a reducing furnace produced by a method characterized by pelletizing a feed powder containing a metal oxide-bearing powder and a carbon-bearing powder, wherein, when producing the green pellets, three or more types of feed powder, including at least two types of iron containing feed powder, are placed in separate storage bins, a mixing ratio of a mixture of feed powders is determined so that the mixture of said feed powder includes 20 to 80 wt % of powder particles of not more than 10 μm size and said feed powders are fed out from said bins, and the mixture of said feed powders is pelletized into green pellets having a porosity of not more than 0.32 using a pan type pelletizer and then the green pellets are dried in a dryer at a temperature of not higher than 250° C. into a zone of a rotary hearth reducing furnace having a furnace ambient temperature of 900 to 1200° C. and reducing them by firing at a temperature of not less than 1200° C. for not less than 5 minutes.

2. A method of reduction of metal oxide-bearing green pellets for a reducing furnace as set forth in claim 1 characterized by charging onto the hearth of the rotary hearth reducing furnace and reducing by firing green pellets having a mean diameter of 8 to 20 mm in a mean number of layers of not more than 2.0.

3. A method of reduction of metal oxide-bearing green pellets for a reducing furnace produced by a method characterized by pelletizing a feed powder comprised of a metal oxide-bearing powder and a carbon-bearing powder, wherein, when producing the green pellets, three or more types of feed powder, including at least two types of iron containing feed powder, are placed in separate storage bins, a mixing ratio of a mixture of feed powders is determined so that the mixture of said feed powder includes 20 to 80 wt % of powder particles having a size of not more than 10 μm and said feed powders are fed out from said bins, and the mixture of said feed powders is pelletized into green pellets having a porosity of not more than 0.32 using a pan type pelletizer to make green pellets, screening the green pellets by a screen to remove undersized and oversized green pellets, reducing the moisture content by a pellet dryer at a temperature of not higher than 250° C., then charging the green pellets into a rotary hearth reducing furnace and reducing by firing the green pellets while continuously conveying green pellets between unit operations.

4. A method of reducing metal oxide-bearing green pellets for a reducing furnace including the steps of:
    obtaining metal oxide-bearing green pellets by shaping a feed powder containing at least one oxide-bearing powder and at least one carbon-bearing powder, wherein, when obtaining the green pellets, three or more types of feed powder, including at least two types of iron containing feed powder, are placed in separate storage bins, a mixing ratio of a mixture of feed powders is determined so that the mixture of said feed powder includes 20 to 80 wt % of the feed powder particles are not more than 10 μm in size and said feed powders are fed out from said bins, and the mixture of said feed powders is pelletized into green pellets having a porosity of not more than 0.32 using a pan type pelletizer drying the green pellets in a dryer at a temperature of not higher than 250° C.;
    charging the metal oxide-bearing green pellets into a zone of a rotary hearth reducing furnace having a furnace ambient temperature of 900 to 1200° C.; and
    reducing the metal oxide-bearing green pellets by firing the furnace at a temperature of not less than 1200° C. for not less than 5 minutes.

5. The method of reducing metal oxide-bearing green pellets as set forth in claim 4, wherein the feed powder includes 5 to 30 wt % of a dry distilled carbon bearing powder.

6. The method of reducing metal oxide-bearing green pellets as set forth in claim 4, wherein the feed powder includes 10 to 35 wt % of fine coal.

7. The method of reducing metal oxide-bearing green pellets as set forth in claim 4, wherein the feed powder includes a total 10 to 60 wt % of two times the percent by weight of a dry distilled carbon-bearing powder and the percent by weight of fine coal.

8. The method of reducing metal oxide-bearing green pellets as set forth in claim 4, wherein the feed powder includes 0.5 to 4 wt % of bentonite or not more than 1 wt % of corn starch as a binder.

9. The method of reducing metal oxide-bearing green pellets as set forth in claim 4, further including the step of:
adjusting a moisture content of the feed powder to be from 8 to 13 wt % prior to the step of shaping the feed powder.

10. The method of reducing metal oxide-bearing green pellets as set forth in claim 4, wherein the feed powder includes 15 to 75 wt % of dust collected by a non combustion type dust collector of converter gas and collected as thickener precipitate.

11. The method of reducing metal oxide-bearing green pellets as set forth in claim 4, wherein the feed powder includes 15 to 75 wt % of dust contained in gas generated from an iron making electric furnace.

12. The method of reducing metal oxide-bearing green pellets as set forth in claim 4, wherein the feed powder is characterized in that the number of moles of atoms of carbon in the feed powder is 0.5 to 1.5 times the number of moles of atoms of oxygen of the metal oxide and wherein the temperature is from 1200 to 1400° C.

13. The method of reducing metal oxide-bearing green pellets as set forth in claim 4, further including the step of:
drying the metal oxide bearing green pellets so that the moisture content is not more than 2 wt % prior to charging the metal oxide bearing green pellets into a zone of a rotary hearth reducing furnace.

14. The method of reducing metal oxide-bearing green pellets as set forth in claim 4, further including the step of:
screening the metal oxide-bearing green pellets to remove undersized green pellets by a screen mesh of not less than 2 mm and to remove oversized green pellets by a screen mesh of not more than 30 mm prior to charging the metal oxide bearing green pellets into a zone of a rotary hearth reducing furnace.

* * * * *